US008665947B2

(12) United States Patent
Lin (10) Patent No.: US 8,665,947 B2
(45) Date of Patent: Mar. 4, 2014

(54) METHOD AND DEVICE FOR VIDEO-STREAM FRAME RATE ADAPTATION, AND FIELD PROGRAMMABLE GATE ARRAY CHIP AND VIDEO STREAM PROCESSING APPARATUS

(75) Inventor: Hui Lin, Beijing (CN)

(73) Assignee: Hangzhou H3C Technologies Co., Ltd., Hangzhou, Zhejiang Province (CN)

( * ) Notice: Subject to any disclaimer, the term of this patent is extended or adjusted under 35 U.S.C. 154(b) by 1098 days.

(21) Appl. No.: 12/603,715

(22) Filed: Oct. 22, 2009

(65) Prior Publication Data

US 2010/0104007 A1    Apr. 29, 2010

(30) Foreign Application Priority Data

Oct. 23, 2008  (CN) .......................... 2008 1 0171651

(51) Int. Cl.
  *H04N 7/12*  (2006.01)
  *H04N 11/02*  (2006.01)
  *H04N 11/04*  (2006.01)

(52) U.S. Cl.
  USPC .................................................. 375/240.02

(58) Field of Classification Search
  USPC .................................................. 375/240.02
  See application file for complete search history.

(56) References Cited

U.S. PATENT DOCUMENTS

| 5,909,513 A * | 6/1999 | Liang et al. ................... 382/253 |
| 6,297,846 B1 * | 10/2001 | Edanami ....................... 348/239 |
| 6,584,493 B1 * | 6/2003 | Butler ........................... 709/204 |
| 7,743,161 B2 * | 6/2010 | Dey et al. ..................... 709/231 |
| 8,254,442 B2 * | 8/2012 | Person et al. ............ 375/240.02 |
| 2009/0167763 A1 * | 7/2009 | Waechter et al. ............. 345/426 |

* cited by examiner

*Primary Examiner* — Chikaodili E Anyikire
(74) *Attorney, Agent, or Firm* — Ladas & Parry LLP (57) ABSTRACT

This invention provides a method and device for video-stream frame rate adaptation. The method includes: allocating a buffer space for each of at least one video conference room respectively and dividing the buffer space into at least one segment, each segment of which is used for buffering a video frame; and performing following steps for each of the at least one video conference room: generating a pulse signal for the video conference room periodically according to a certain pulse rate; and performing a data writing operation for a segment of the corresponding buffer space at an input-video-stream frame rate of the video conference room, and performing a reading operation for a segment of the buffer space at an output-video-stream frame rate. This invention also provides an FPGA chip and a video stream processing apparatus. The invention simplifies frame rate adaptation design, and reduces system processing overhead during the frame rate adaptation.

19 Claims, 6 Drawing Sheets

Prior Art

Figure 1

Prior Art

METHOD AND DEVICE FOR VIDEO-STREAM FRAME RATE ADAPTATION, AND FIELD PROGRAMMABLE GATE ARRAY CHIP AND VIDEO STREAM PROCESSING APPARATUS

CROSS-REFERENCE TO RELATED APPLICATIONS

This application claims priority to Chinese Patent Application No. 200810171651.1 filed Oct. 23, 2008, which is incorporated herein by reference as if reproduced in its entirety.

FIELD OF THE INVENTION

The present invention relates to the field of video stream processing techniques, and in particular to a method and device for video-stream frame rate adaptation of an IP multimedia conference. The present invention further relates to a Field Programmable Gate Array (FPGA) chip and a video stream processing apparatus.

BACKGROUND OF THE INVENTION

At present, more and more video stream processing apparatuses supporting the IP multimedia conference, e.g. the Multipoint Control Unit (MCU) and the Multimedia Gateway (MG) in the IP multimedia conference and the like, use an FPGA chip to implement video stream processing by way of hardware logic, thus to improve video stream processing performance.

Figure 1:
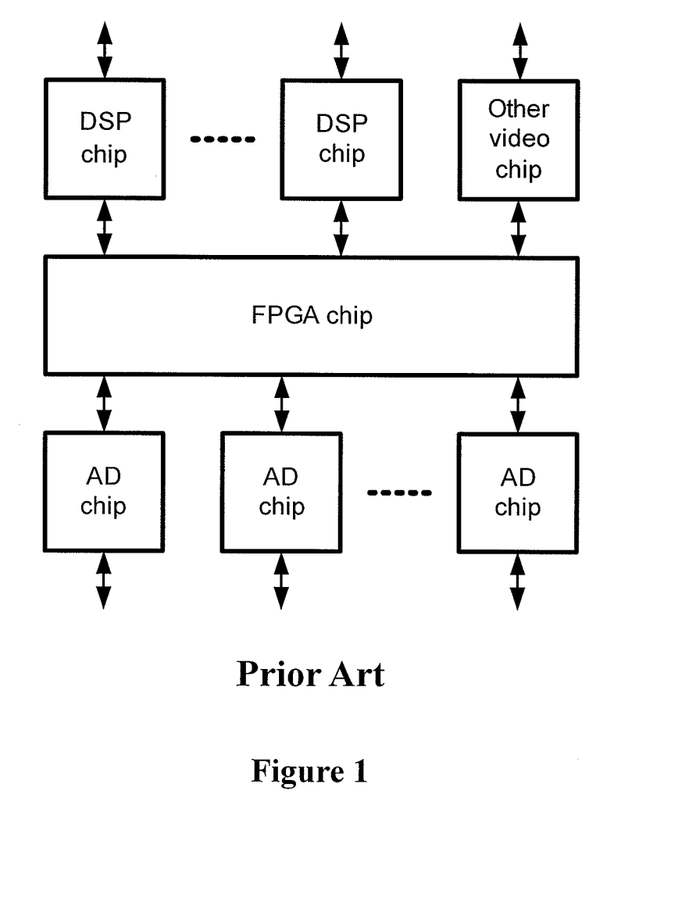
FIG. 1 is a diagram illustrating a common FPGA-based video stream processing infrastructure of the prior art.

FIG. 1 illustrates a common FPGA-based video stream processing infrastructure of the prior art. An AD chip, which is connected with a terminal camera apparatus or a terminal display apparatus, is used for performing an A/D or D/A conversion for the inputted/outputted video stream. The FPGA chip is mainly used for pre-processing the input video stream and post-processing the output video stream, such as zooming, cutting, multi-image stitching, de-interlacing and caption of the video image. The Digital Signal Processing (DSP) chip is used for decoding/coding the input/output video stream, and sending it over a specific communication protocol to the network side or to another processing apparatus for transmission or further processing.

Because the frame rates of the video streams received/sent by the AD chip may be different from each other, the FPGA chip needs to receive the video stream from an input interface at a certain frame rate and then forwards it out through an output interface at another frame rate, and even needs to perform multi-image stitching for input video streams of various frame rates. Therefore, the FPGA chip needs to perform an adaptation operation for various frame rates during video stream processing.

Figure 2:
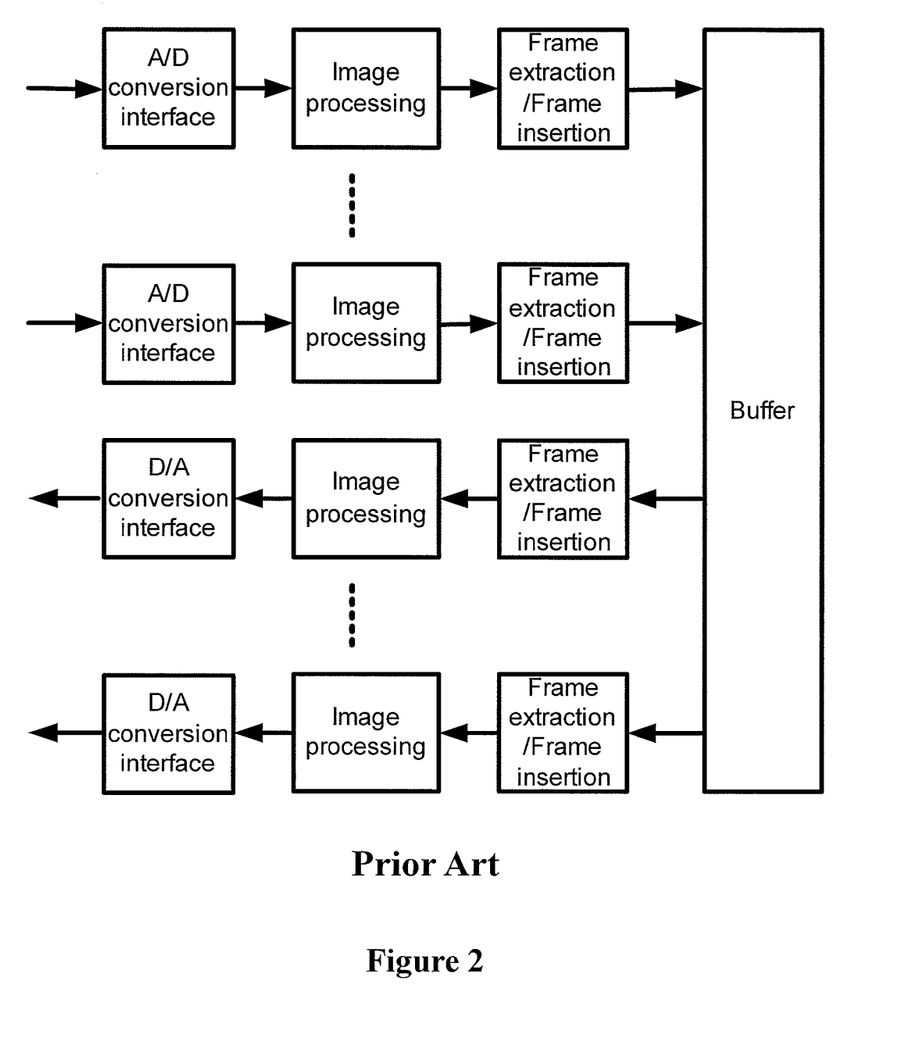
FIG. 2 is a block diagram illustrating a logic implementation in the prior art that an FPGA chip performs frame rate adaptation.

In the prior art, the FPGA chip implements adaptation for various frame rates by way of Frame Extract/Insert unit. Because for the FPGA chip, the required frame rates of the input video stream and the output video stream that relate to different IP multimedia conferences may be different from those of others, and there may be multiple input video streams that relate to the same IP multimedia conference (i.e. it is required to stitch multiple images for every output video stream), the FPGA chip typically takes the minimum frame rate of the input data stream and the output data stream of all the IP multimedia conferences as the system frame rate, so as to implement adaptation for various input/output frame rates. FIG. 2 illustrates a logic implementation that an FPGA chip performs frame rate adaptation. The inputted A/D conversion signal is received via the A/D conversion interface, image processing is carried out and then frame extraction is performed, so that the frame rate of every input data stream is adjusted as the same system frame rate. Frame insertion is performed for the outputted video stream, so that every output data stream is changed from the same system frame rate to the corresponding output frame rate. Specifically, in order to buffer the video stream, and to stitch the multiple images in the multi-image circumstance, a Buffer is configured to buffer the data stream. The interface capacity of the Buffer is determined from multiplying the system frame rate by the maximum image size and the number of input/output interfaces.

It can be seen that there are problems as follows in the conventional FPGA chip frame rate adaptation solution.

1. It is required to provide a dedicated Frame Extract/Insert unit, thus increasing the difficulty of chip logic design and the resource overhead of chip processing.

2. It is required to perform an accurate frame extraction/insertion calculation to implement the frame rate adaptation, and the corresponding calculation is particularly much more complicated if the input/output frame rate and the system frame rate are not integer multiple related to each other.

3. The minimum frame rate of all the interfaces is taken as the system frame rate, thus the actual input/output frame rates of most data streams are higher than the system frame rate, thus impacting the image quality of most data streams.

SUMMARY OF THE INVENTION

The embodiments of the present invention, which seeks to solve the above problems of the prior art, provide an effective video-stream frame rate adaptation solution so as to simplify the design and reduce the system processing overhead.

In order to achieve the above object, an embodiment of the present invention provides a method for video-stream frame rate adaptation, which includes: allocating a buffer space for each of at least one video conference room respectively and dividing the buffer space into at least one segment, each segment of which is used for buffering a video frame; and performing following steps for each of the at least one video conference room:

Step S1: generating a pulse signal for the video conference room periodically according to a certain pulse rate;

Step S2: when receiving the generated pulse signal, performing a data writing operation for a first segment of the corresponding buffer space at an input-video-stream frame rate of the video conference room, and performing a data reading operation for a second segment of the buffer space at an output-video-stream frame rate; and Step S3: when receiving the next pulse signal generated, performing the data writing operation for the segment next to the first segment at the input-video-stream frame rate, and performing the data reading operation for the segment next to the second segment at the output-video-stream frame rate.

An embodiment of the present invention further provides a device for video-stream frame rate adaptation, which includes an input/output interface unit and a buffering unit, and further includes:

a buffer space allocating unit, which is connected with the buffering unit, used for allocating a buffer space for each of at least one video conference room respectively;

a segment dividing unit, which is connected with the buffering unit, used for dividing the buffer space into at least one segment, each segment of which is used for buffering a video frame;

a pulse generating unit, which is connected with the input/output interface unit, used for generating a segment pulse for each of the at least one video conference room periodically according to a certain pulse rate and sending the same to the input/output interface unit;

a writing controlling unit, which is connected with the pulse generating unit, the input/output interface unit and the buffering unit, used for performing a data writing operation for a first segment of the corresponding buffer space at an input-video-stream frame rate of the video conference room when receiving the generated pulse signal, and performing the data writing operation for the segment next to the first segment at the input-video-stream frame rate when receiving the next pulse signal generated; and a read controlling unit, which is connected with the pulse generating unit, the input/output interface unit and the buffering unit, used for performing a data reading operation for a second segment of the buffer space at an output-video-stream frame rate when receiving the generated pulse signal, and performing the data reading operation for the segment next to the second segment at the output-video-stream frame rate when receiving the next pulse signal generated.

An embodiment of the present invention further provides a Field Programmable Gate Array chip, which is configured with the device for video-stream frame rate adaptation.

An embodiment of the present invention further provides a video stream processing apparatus, which is configured with the device for video-stream frame rate adaptation or the Field Programmable Gate Array chip.

It can be seen from the above technical solutions that, by performing data writing for a segment and performing data reading for a segment between two pulse signals, the embodiments of the present invention implement adaptation for the input/output frame rate, thus achieving the advantages of simplifying frame rate adaptation design, and reducing system processing overhead during the frame rate adaptation.

With the following description of the preferred embodiments by referring to the appended drawings, the present invention, such as the objects, characteristics and advantages thereof that have been mentioned in the above, is further clarified.

DETAILED DESCRIPTION OF THE EMBODIMENTS

The specific embodiments of the present invention are described in detail hereinbelow. It should be noted that the embodiments described herein are merely intended to illustratively describe, but not to limit, the present invention.

The present invention adopts the core idea of using different buffer spaces for different video conference rooms of the IP multimedia conference, where for each video conference room it is controlled to perform data writing for only one segment and perform data reading for only one segment between two pulse signals, thus taking the place of the conventional frame extraction/insertion solution to solve the problem of input/output frame rate adaptation. In order to better clarify the present invention, the video-stream frame rate adaptation solution provided by the present invention is described in detail hereinbelow.

First of all, the method for video-stream frame rate adaptation provided by the present invention is depicted. It should be noted that the method for video-stream frame rate adaptation provided by the present invention is mainly applied to circumstances where it is required to perform adaptation for the frame rate of the video stream inputted/outputted by the AD chip, e.g. may be applied in the MCU and MG apparatus of the IP multimedia conference, and so on.

It should be noted that the IP multimedia conference has a particular characteristic in image displaying.

A two-party video conference is taken as an example. Generally, after a party initiates a conference request, the opposite party responds thus to establish a video session between the two parties. Apparently, although the two parties are related to the same video session, the displayed contents of them are totally different from each other, where each of them displays the conference image of its opposite party, i.e. there are two different conference rooms.

Alternatively, for a multi-part video conference, the parties are all related to the same video session, but each of them displays the information of the other parties, thus there are multiple different conference rooms.

From this point of view, the MCU and MG apparatus supporting the IP multimedia conference performs video stream processing with respect to each video conference room, thus the method for video-stream frame rate adaptation provided by the present invention solves the problem of frame rate adaptation with respect to the video conference room.

Figure 3:
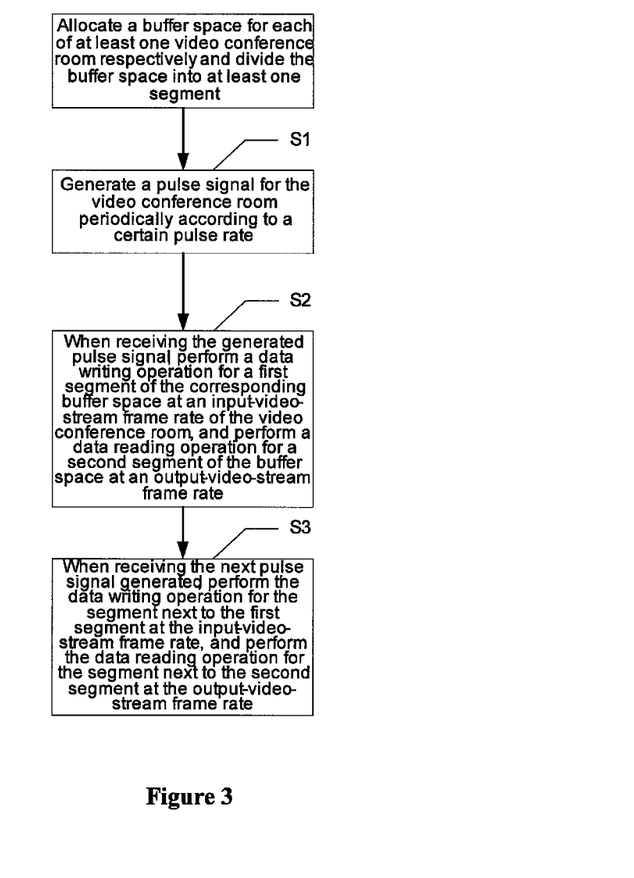
FIG. 3 is a flowchart illustrating a method for video-stream frame rate adaptation according to an embodiment of the present invention.

FIG. 3 is a flowchart illustrating a method for video-stream frame rate adaptation according to an embodiment.

Firstly, allocate a buffer space for each of at least one video conference room respectively and divide the buffer space into at least one segment, each segment of which is used for buffering a video frame Specifically, allocating the buffer space for each video conference room can be implemented by dividing the available buffer according to the number and the type of video conference room.

The implementation according to the number of video conference room can be understood more easily, i.e. if there are two video conference rooms, the buffer is divided into two parts, and if there are N video conference rooms, the buffer is divided into N parts. In a word, it is ensured that every video conference room has its own buffer space.

The type of video conference room means that different video conference rooms are of different types from each other, e.g. the display requirement of a conference room terminal may be 1080P (in the vertical direction of grating, 1080 progressive scan lines form a frame of image), or alternatively may be 720P (in the vertical direction of grating, 720 progressive scan lines form a frame of image), where the buffer spaces occupied by the video frames of different video conference rooms may be of different sizes.

Because the total size of the buffer has a limit, the buffer space should be divided by taking the number and the type of video conference room as a whole into account, and should be divided as proportionally as possible, so as to make full use of the buffer.

Of course, the available buffer is divided may means that all the available buffer is divided. Alternatively, in order to ensure that a newly joined video conference room can be supported, some buffer spaces may be reserved, while the rest buffer spaces are divided.

The allocated buffer space needs to be divided into at least one segment to implement the frame rate adaptation. Specifically, the division into segment is performed according to the type of video conference room, where it is ensured that the segment is a basic element for buffering a video frame, with each segment buffering only one video frame.

Specifically, the video frames of different types of video conference rooms are of different sizes from each other, thus during the division into segment, the size of the segment should firstly be determined according to the video conference room, i.e. the segments of the buffer spaces of different video conference rooms are of different sizes from each other, so as to ensure that each segment can store only one video frame. Furthermore, because the size of the video space is determined depending on the actual apparatus and there are spaces being continuously used and released, the number of the segments that constitute the video space is not fixed.

After the buffer space of every video conference room is divided into segments, the frame rate adaptation may be performed for each video conference room. The following steps are performed.

Step S1: Generate a pulse signal for the video conference room periodically according to a certain pulse rate.

It can be seen that, a set of pulse signal is respectively generated for each video conference room, and when there are N video conference rooms at a time, N sets of pulse signals may be generated correspondingly.

It should be noted that, if the global minimum frame rate is used (as in the prior art), all the pulse signals may be generated according to the same frame rate.

However, because the corresponding buffer spaces have been allocated for the various video conference rooms in the above, where the video conference rooms are independent from each other, there is no need to take the minimum frame rate of all the input/output video streams of the whole system as the frame rate for adaptation, but the minimum of the input-video-stream frame rate and the output-video-stream frame rate of the video conference room, or alternatively a little bit lower than the minimum of the input-video-stream frame rate and the output-video-stream frame rate of the video conference room, is used instead.

Apparently, when the input/output video streams of various video conference rooms are adjusted as the minimum frame rate of the video conference room, although there may be some image loss in the high frame rate video stream of the video conference room having a relatively great difference in its frame rate, the effect apparently is better than that resulted from using the minimum frame rate of the whole system. For the video conference room having a relatively slight difference in its frame rate, the image loss is very small, thus the image effect may be greatly improved if being compared with the prior art where the same frame rate is used for the whole system.

Based on the periodically generated pulse signal, this embodiment uses the following solutions to implement the frame rate adaptation.

Step S2: When receiving the generated pulse signal, perform a data writing operation for a first segment of the corresponding buffer space at an input-video-stream frame rate of the video conference room, and perform a data reading operation for a second segment of the buffer space at an output-video-stream frame rate.

Because a segment can store only one video frame, the writing update is performed in the same segment (the first segment) no matter at which frame rate the input video data stream is written, where such a simple frame update is equivalent to automatically implementing the frame extraction processing. Similarly, it is the video frame in the same segment (the second segment) that is read out no matter at which frame rate the output video data stream is read out, where such a simple frame copy is equivalent to automatically implementing the frame insertion processing.

Further, in this step, if the video conference room is composed of multiple images, i.e. the video conference room actually includes multiple input video streams where each image thereof is related to one of at least one input video stream, additional processing needs to be performed for the video stream of the video conference room, so as to complete image stitching when writing. Specifically, the data writing operation performed in this case includes the following.

Perform data compress processing for each of the at least one input video stream of the video conference room (e.g. compress into 1/N of the original image, where N is the number of the input video streams).

Write into a position of the corresponding first segment at the input-video-stream frame rate of each input video stream respectively, which position has a corresponding offset.

It can be seen that, each input video stream performs update repeatedly at the corresponding offset position of the same segment at its own frame rate, thus automatically implementing the frame extraction processing for each input video stream and further completely forms the whole frame image, i.e. the image stitching is completed and meanwhile the frame rate adaptation is implemented for each input video stream.

Step S3: When receiving the next pulse signal generated, perform the data writing operation for the segment (which acts as the new first segment) next to the first segment at the input-video-stream frame rate, and perform the data reading operation for the segment (which acts as the new second segment) next to the second segment at the output-video-stream frame rate.

It can be seen from this step that, for the video conference room, data writing is performed for only one segment and data reading is performed for only one segment between two pulses. When the next pulse arrives, a segment switching operation may be performed, where data writing is performed for the next segment (the new first segment) and data reading is performed for the next segment (the new second segment). It is the video frame written in the last before the next pulse signal arrives that is stored in the original first segment, and meanwhile, the video frame in the original second segment is read out repeatedly at the output-video-stream frame rate.

In order to make those skilled in the art understand the technical solutions of the present invention better, description is made with reference to exemplary data hereinbelow.

It is assumed that the input-video-stream frame rate of a video conference room is 36 frames/second and the output-video-stream frame rate is 24 frames/second, then it can be determined that the pulse rate of the video conference room is 24 times/second, or a little bit lower such as 22 times/second. The 22 times/second is taken as an example.

Thus, from the 0 second, the first pulse signal is generated, where the initial first/second segments of the buffer space are denoted as A1, B1; at the 1/22 second, the second pulse signal is generated, where the next segments are denoted as A2, B2; and at the 2/22 second, the third pulse signal is generated, where the next segments are denoted as A3 and B3; and so on.

Meanwhile, from the 0 second, the input video stream performs writing for the buffer space of the video conference room at the rate of 36 frames/second, i.e. at the 0 second, the first frame is written thereinto; at the 1/36 second, the second frame is written thereinto; and at the 2/36 second, the third frame is written thereinto; and so on.

Further, from the 0 second, the output video stream performs reading for the buffer space of the video conference room at the rate of 24 frames/second, i.e. at the 0 second, the first frame is read out; at the 1/24 second, the second frame is read out; and at the 2/24 second, the third frame is read out; and so on.

It can be seen that, after the first pulse signal is generated, the input video stream begins to write data into A1. Because the frame rate of the input video stream is higher, the next pulse signal is not received at the 1/36 second, and therefore the second frame, which replaces the first frame having been written thereinto previously, is written still into A1.

At the 1/22 second, the second pulse signal is generated, thus the third frame written by the input video stream after the 1/22 second shall be written into A2. Because the third pulse signal is to be generated at the 2/22 second, the fourth frame written by the input video stream at the 3/36 second is written still into A2.

Therefore, as a result, it is the second frame, the fourth frame and so on of the input video stream that is written into the buffer. In this way, there is no need to perform frame rate adaptation calculation, and the frame extraction processing is implemented automatically.

Meanwhile, after the first pulse signal is generated, the output video stream begins to read out data from B1. Because the frame rate of the output video stream is higher, the next pulse signal is not received at the 1/24 second, thus the second frame is read out still from B1.

At the 1/22 second, the second pulse signal is generated, thus the third frame read out by the output video stream after the 1/22 second shall be from B2.

Because the fourth frame is read out at the 3/24 second, while the third pulse signal is generated at the previous 2/22 second, the fourth frame of the output video stream is read out from B3.

Therefore, as a result, the video frames read out from the buffer space are those video frames stored in B1, B1, B2, B3, and so on. Similarly, there is no need to perform frame rate adaptation calculation, and the frame insertion processing is implemented automatically.

It can be seen from the above steps that, by dividing the buffer and switching among those segments, the method for video-stream frame rate adaptation provided by the present invention can effectively take the place of the frame extraction/insertion processing of the prior art, thus solving the problem of complex algorithm and high processing overhead. Meanwhile, in that the conference rooms use pulse rates independent from each other, the quality of the finished image can further be improved.

Further, as mentioned in the above embodiment, the writing operation is performed for one segment (the first segment), and the reading operation is performed for another segment (the second segment).

The first segment and the second segment may be the same segment of the buffer space, i.e. the input/output interface implements writing and reading for the same segment. However, performing writing and reading for the same segment may cause the output effect unstable, e.g. a video frame having not been writing thereinto completely may be read out. The instability is particularly serious for the multi-party video conference room.

Therefore, a preferred solution is to configure the first/second segment as being separate from each other. Specifically, the second segment may be configured as behind the first segment, with a predetermined segment interval being therebetween, e.g. the second segment is configured as two segments behind the first segment, so as to avoid the data reading error in the buffer.

Because the subsequent first/second segment of the video conference room is switched synchronously with the pulse signal on the basis of the previous first/second segment, the subsequent first/second segment maintains such an interval.

In this case, it apparently can be ensured that the data having been read out are all complete video frames, thus avoiding the problem of data error. As can be seen, in the aspect of data reading, those segments having been read out at the beginning have not actually been written with video frames, thus there is no content to display. After a corresponding number of signal pulses, the video contents are displayed when the segment is written with a video frame.

Further, the present invention also provides a specific embodiment of implementing buffer space segment switching according to the signal pulse, which includes the following.

When the buffer space is divided into segments, the divided segments of the buffer space are allocated with continuous segment IDs. Of course, the continuous segment IDs having been allocated may not necessarily be related to continuous segments, but are used for identifying the divided segments, so as to be used in the subsequent reading/writing.

Also, the initial first segment ID and the initial second segment ID of each buffer space are determined, i.e. the initial writing and reading positions of each buffer space are determined. Of course, it may be the default setting of the system that is used, i.e. it is defaulted that writing and reading begin from the smallest segment ID.

After the above configuration, the periodically generated pulse signal may be issued with the accumulated first segment ID and second segment ID being carried therein. The accumulation operation may be implemented by means of a counter configured for the video conference room. For each video conference room, the counter performs an increment on the basis of the initial first segment ID and second segment ID of the video conference room each time the timeslot pulse is generated.

After receiving the pulse signal, the input/output interface of the processing apparatus may address the corresponding segment according to the first segment ID and the second segment ID carried in the pulse signal to perform the data writing operation and the data reading operation, thus the buffer space segment switching is implemented according to the signal pulse.

Specifically, the pulse signal may be issued in two ways.

1: The generated pulse signal is sent to the corresponding input/output interface of the corresponding video conference room, where the input/output interface performs subsequent processing.

2: The generated pulse signal is sent to all input/output interfaces, where the corresponding input/output interface identifies the pulse signal that shall be processed according to a corresponding video conference room identifier carried in the pulse signal and performs subsequent processing.

It should be noted that, for the multi-party video conference room, each input video stream is related to multiple conference rooms, thus the input interface may be connected to the segment IDs of multiple conference rooms and then perform the subsequent writing operation respectively.

In order to facilitate description, for example, the video conference rooms of a video conference having four parties A, B, C and D are denoted as a, b, c and d respectively.

Typically, the video conference room a of the party A may display the information of the parties B, C and D at a time, i.e. three images are stitched and displayed at a time, thus the three data streams generated by the parties B, C and D serve as the input data stream of the video conference room a simultaneously. Of course, the party A may only choose one or two parties to display, then the corresponding data stream is not required to be compressed or only required to be compressed into ½ of the whole image, which is not described in detail herein.

Similarly, the three data streams generated by the parties A, C and D serve as the input data stream of the video conference room b simultaneously, the three data streams generated by the parties A, B and D serve as the input data stream of the video conference room c simultaneously, and the three data streams generated by the parties A, B and C serve as the input data stream of the video conference room d simultaneously.

It can be seen that in the above case, the data stream generated by the party A is related to the video conference rooms b, c, and d at a time, the data stream generated by the party B is related to the video conference rooms a, c, and d at a time, and so do the data stream generated by the parties C and D.

In this way, the data stream generated by the party A is taken as an example, the corresponding input interface may be connected to the segment ID related to the conference rooms b, c and d, and carries such three segment IDs to perform the subsequent operation, i.e. to perform writing for the corresponding segment of the buffer space of the video conference rooms b, c and d according to each segment ID.

Besides, those skilled in the art shall understood that, if the buffer is read/written according to the segment IDs in an ascending-order way, the subsequent accumulated segment ID is from the increment on the basis of the initial segment ID; if the buffer is read/written according to the segment IDs in a descending-order way, the subsequent accumulated segment ID is from the decrement on the basis of the initial segment ID; or alternatively, another ID accumulation manner may be used depending on how the segment is used.

Further, because the first/second segment IDs are the same as each other or are different from each other by a fixed distance, the pulse signal may carry only the accumulated first segment ID or the accumulated second segment ID, where the interface calculates out the corresponding second segment ID or first segment ID according the relationship between the first/second segment IDs.

Further, because the capacity of the buffer space has a limit, a preferred embodiment further includes the following. After the reading operation is performed for the video frame contained in the second segment of the buffer space, the segment is allocated with a new segment ID, which is numbered continuously with the allocated segment ID of the buffer space. In this way, the subsequent video frame may be written into the segment again, thus realizing the recycling utilization of the buffer space.

As a specific embodiment, the method for video-stream frame rate adaptation provided by the present invention is depicted by taking the video stream processing of the IP multimedia conference as an example.

Figure 4:
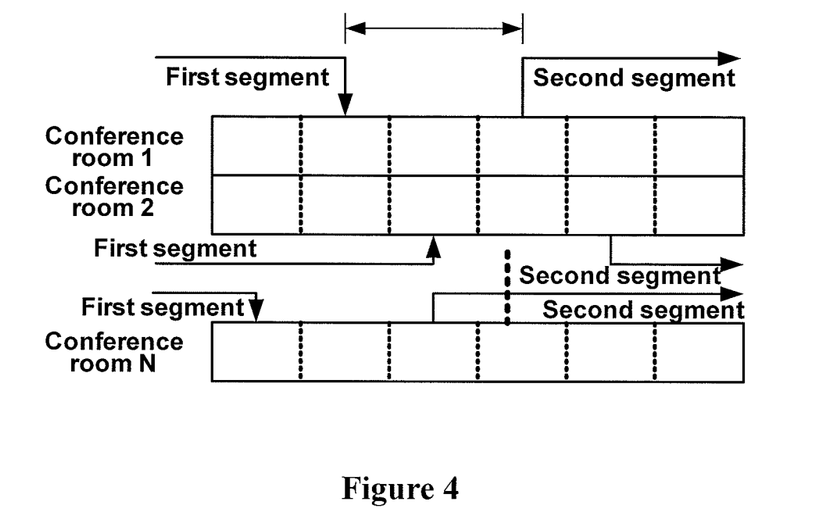
FIG. 4 is a diagram illustrating buffer space allocation and segment division of the method for video-stream frame rate adaptation according to a specific embodiment of the present invention.

Firstly, the buffer space is divided according to the type and the number of video conference room. As illustrated in FIG. 4, the buffer space is divided according to the conference rooms 1, 2, . . . , N, where the conference room may be composed of a single image (include only one input video stream), or may be composed of multiple images (include multiple input video streams).

Then, the buffer space of each video conference room is divided into multiple segment spaces, each segment of which is used for buffering a video frame. In order to avoid data error, the first segment (the segment where the writing pointer is located) and the second segment (the segment where the reading pointer is located) are not located at the same segment, but are a certain distance separate from each other. In this embodiment, the distance is 2 segments.

According to the pulse rate of each conference room, the corresponding pulse signal is generated periodically, and is issued with the accumulated second segment ID being carried therein, which instructs performing segment switching.

For each video conference room, the AD conversion interface (there may be one or more such interfaces) receives the pulse signal, obtains the first segment ID by subtracting the segment distance from the second segment ID, and writes the video stream of the interface into the segment corresponding to the first segment ID.

Similarly, for each video conference room, the AD conversion interface (there may be one or more such interfaces) receives the pulse signal, and reads the video frame from the segment corresponding to the second segment ID to form the output video stream.

When the next segment pulse arrives, the writing and reading operations are performed for the next first/second segment.

Those skilled in the art shall understand that, all or part of the steps according to the embodiment of the above method can be implemented by program instructing relevant hardware. The program may be stored in a computer readable storage medium. The program, when being executed, includes: allocating a buffer space for each of at least one video conference room respectively and divides the buffer space into at least one segment, each segment of which is used for buffering a video frame; and performing following steps for each of the at least one video conference room:

Step S1: generating a pulse signal for the video conference room periodically according to a certain pulse rate;

Step S2: when receiving the generated pulse signal, performing a data writing operation for a first segment of the corresponding buffer space at an input-video-stream frame rate of the video conference room, and performing a data reading operation for a second segment of the buffer space at an output-video-stream frame rate; and Step S3: when receiving the next pulse signal generated, performing the data writing operation for the segment next to the first segment at the input-video-stream frame rate, and performing the data reading operation for the segment next to the second segment at the output-video-stream frame rate.

The storage medium includes: a Read Only Memory/Random-Access Memory (ROM/RAM), a magnetic disk or an optical disk or the like.

The device for video-stream frame rate adaptation provided by the present invention is described hereinbelow.

Figure 5:
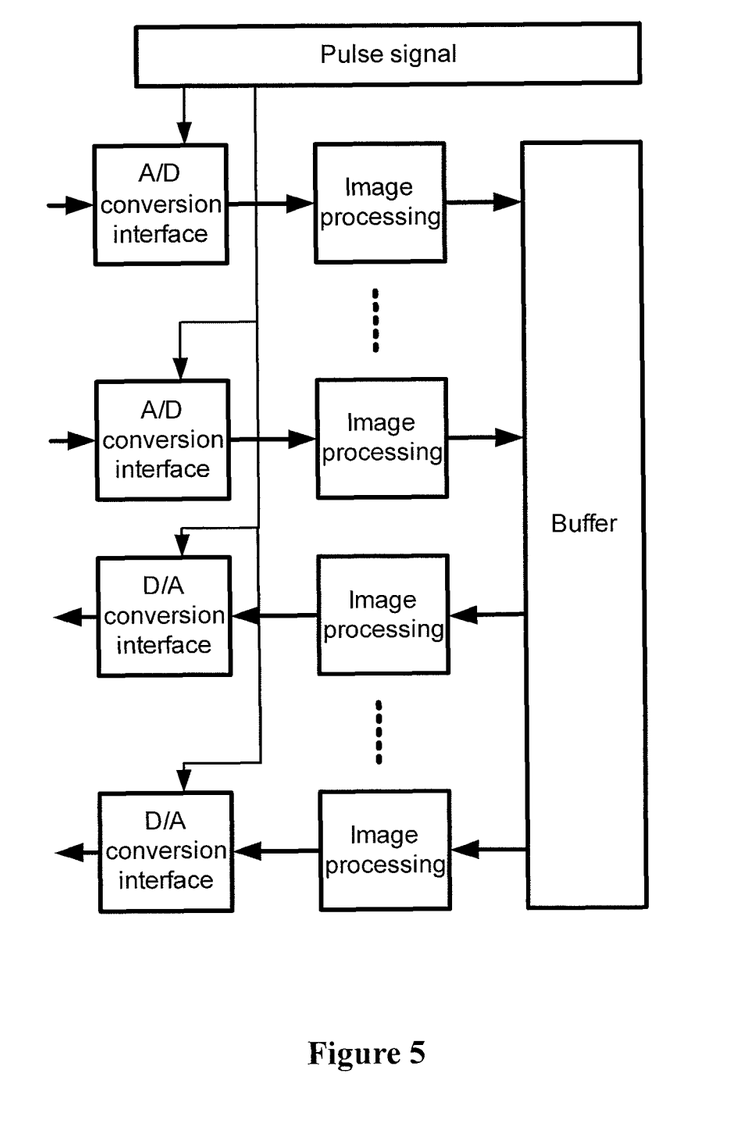
FIG. 5 is a diagram illustrating the principle of a device for video-stream frame rate adaptation according to the present invention.

The device for video-stream frame rate adaptation provided by the present invention does not need the dedicated Frame Extract/Insert unit, where the writing and reading frame rate adaptation of each interface is controlled by way of generating the pulse signal, as illustrated in FIG. 5.

Figure 6:
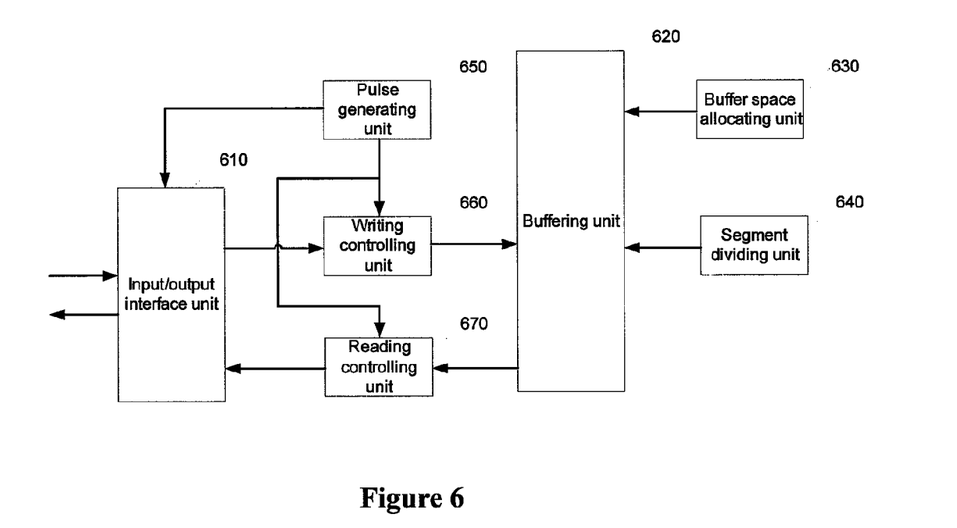
FIG. 6 is a block diagram illustrating the device for video-stream frame rate adaptation according to an embodiment of the present invention.

FIG. 6 is a block diagram illustrating the device 600 for video-stream frame rate adaptation according to an embodiment of the present invention, which includes the following.

An input/output interface unit 610, used for receiving a video stream outputted by an AD conversion chip and writing the same into a buffering unit 620, and reading the video stream from the buffering unit 620 and sending the same to the AD conversion chip, where the input/output interface unit 610 may include multiple input/output interfaces.

The buffering unit 620.

A buffer space allocating unit 630, which is connected with the buffering unit 620, used for allocating a buffer space for each of at least one video conference room respectively. Specifically, the buffer space may be allocated according to the number and the type of video conference room, so that each video conference room has an independent buffer space.

A segment dividing unit 640, which is connected with the buffering unit 620, used for dividing the buffer space into at least one segment, each segment of which is used for buffering a video frame.

It should be noted that, the buffer space allocating unit 630, the segment dividing unit 640 and the buffering unit 620 together provide an arrangement for allocating the addresses contained in the buffer, so as to operate with the frame rate adaption solution provided by the present invention. Specifically, the buffer space allocating unit 630, the segment dividing unit 640 and the buffering unit 620 can be integrated.

A pulse generating unit 650, which is connected with the input/output interface unit 610, used for generating a segment pulse for each of the at least one video conference room periodically according to a certain pulse rate and sending the same to the input/output interface unit 610.

A writing controlling unit 660, which is connected with the pulse generating unit 650, the input/output interface unit 610 and the buffering unit 620, used for performing a data writing operation for a first segment of the corresponding buffer space at an input-video-stream frame rate of the video conference room when receiving the generated pulse signal, and performing the data writing operation for the segment next to the first segment at the input-video-stream frame rate when receiving the next pulse signal generated.

A reading controlling unit 670, which is connected with the pulse generating unit 650, the input/output interface unit 610 and the buffering unit 620, used for performing a data reading operation for a second segment of the buffer space at an output-video-stream frame rate when receiving the generated pulse signal, and performing the data reading operation for the segment next to the second segment at the output-video-stream frame rate when receiving the next pulse signal generated.

Specifically, the first segment and the second segment of the buffer space are the same segment of the buffer space. Alternatively, the first segment may be a predetermined distance prior to the second segment so as to ensure the integrity of the data that is read out.

It can be seen that, by performing data writing for only one segment and performing data reading for only one segment between two pulse signals, the device 600 for video-stream frame rate adaptation provided by the present invention can effectively take the place of the frame extraction/insertion processing of the prior art, thus solving the problem of complex algorithm and high processing overhead.

Figure 7:
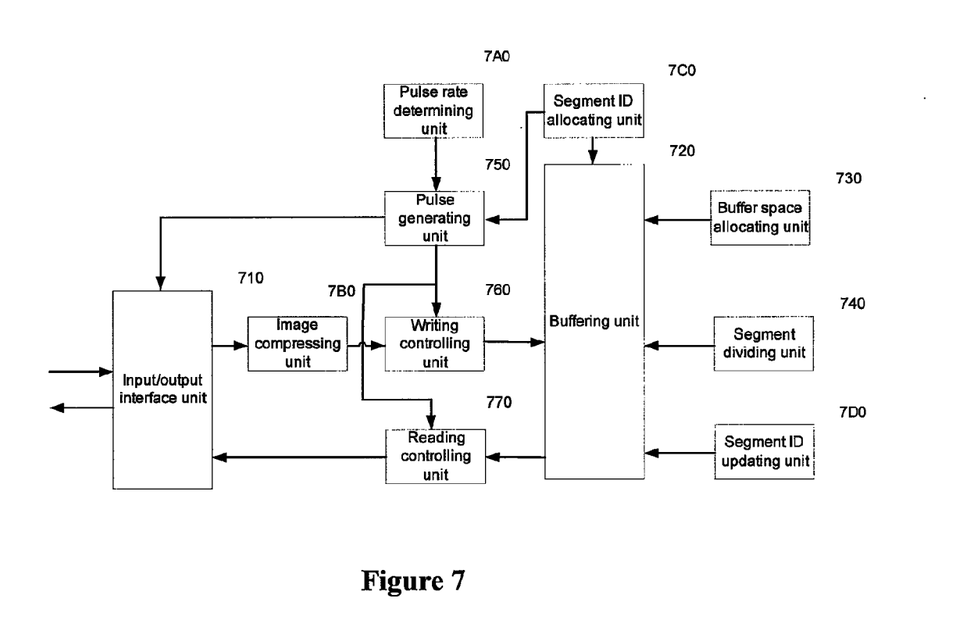
FIG. 7 is a block diagram illustrating the device for video-stream frame rate adaptation according to another embodiment of the present invention.

As a preferred embodiment, FIG. 7 is a block diagram illustrating the device 700 for video-stream frame rate adaptation provided by the present invention, which includes the following.

An input/output interface unit 710, a buffering unit 720, a buffer space allocating unit 730, a segment dividing unit 740, a pulse generating unit 750, a writing controlling unit 760 and a read controlling unit 770, the connection relationships thereamong and the functions thereof are the same as those of the corresponding units of the embodiment illustrated in FIG. 6.

The device further includes the following.

A pulse rate determining unit 7A0, which is connected with the pulse generating unit 750, used for determining the pulse rate of the video conference room according to a minimum of the input-video-stream frame rate and the output-video-stream frame rate of the video conference room, wherein the pulse rate is no higher than the minimum of the input-video-stream frame rate and the output-video-stream frame rate of the video conference room, so as to improve the quality of the processed image if being compared with the globally identical pulse rate.

An image compressing unit 7B0, which is configured between the input/output interface unit 710 and the writing controlling unit 760, used for performing data compression processing for each of at least one input video stream of the video conference room composed of multiple images and sending the processed video stream to the writing controlling unit 760, so that the writing controlling unit 760 is adapted to write into a position of the corresponding segment at the input-video-stream frame rate of each input video stream respectively, which position has a corresponding offset, so as to implement image stitching, wherein each image of the video conference room composed of the multiple images is related to one of the at least one input video stream.

Besides, as a specific manner for implementing identification in segment reading/writing, the device 700 for video-stream frame rate adaptation further includes the following.

A segment ID allocating unit 7C0, which is connected with the buffering unit 720 and the pulse generating unit 750, used for allocating a continuous segment ID for the divided segment of the buffer space, and determining an initial first segment ID and an initial second segment ID of the buffer space and sending the same to the pulse generating unit 750, so that the pulse signal generated periodically by the pulse generating unit 750 is adapted to carry the accumulated first segment ID and second segment ID, and the writing/reading controlling unit is adapted to address the corresponding segment according to the first segment ID and the second segment ID carried in the pulse signal so as to perform the data writing operation and the data reading operation.

Specifically, the first/second segment IDs may be the same as each other, i.e. reading/writing is performed for the same segment. Alternatively as a preferred solution, the first/second segment IDs may have a certain number of differences therebetween. No matter which manner is used, there is a determined relationship between the first/second segment IDs, thus the pulse signal may carry only the first segment ID or the second segment ID, where the corresponding second segment ID or first segment ID are calculated out by the corresponding input/output interface unit 610 and are carried in the video stream to be sent to the processing unit of the next level.

A segment ID updating unit 7D0, which is connected with the buffering unit 720, used for allocating a new segment ID, which is numbered continuously with the allocated segment ID of the buffer space, for the segment after the reading operation is performed for a video frame of the second segment of the buffer space, so as to realizing the recycling utilization of the buffer space.

The present invention further provides an FPGA chip, which is configured with the device for video-stream frame rate adaptation.

The present invention further provides a video stream processing apparatus, which is configured with the device for video-stream frame rate adaptation or the FPGA chip.

Although the present invention has been described with reference to several specific embodiments, it should be understood that the employed terms are illustrative and exemplary, instead of a limit thereto. The present invention may be embodied in various ways without departing from the spirit or substance of the present invention, thus it should be understood that the above embodiments are not limited to any of the above description, but should be explained broadly within the spirit and scope as defined by the appended claims. Hence, all variations and modifications within the scope of the claims or the equivalents thereof are encompassed by the appended claims.

What is claimed is:

1. A method for video-stream frame rate adaptation, comprising:
    allocating a buffer space for each of at least one video conference room respectively and dividing the buffer space into at least one segment, each segment of which is used for buffering a video frame; and performing following steps for each of the at least one video conference room:
        Step S1: generating a pulse signal for the video conference room periodically according to a certain pulse rate;
        Step S2: when receiving the generated pulse signal, performing a data writing operation for a first segment of the corresponding buffer space at an input-video-stream frame rate of the video conference room, and performing a data reading operation for a second segment of the buffer space at an output-video-stream frame rate; and
        Step S3: when receiving the next pulse signal generated, performing the data writing operation for the segment next to the first segment at the input-video-stream frame rate, and performing the data reading operation for the segment next to the second segment at the output-video-stream frame rate.

2. The method for video-stream frame rate adaptation according to claim 1, wherein the pulse rate in the Step S1 is not higher than a minimum of the input-video-stream frame rate and the output-video-stream frame rate of the video conference room.

3. The method for video-stream frame rate adaptation according to claim 1, wherein the first segment and the second segment in the Step S2 are the same segment of the buffer space.

4. The method for video-stream frame rate adaptation according to claim 1, wherein for the video conference room composed of multiple images, where each image thereof is related to one of at least one input video stream, the performing the data writing operation comprises:
    performing data compression processing for each of the at least one input video stream of the video conference room; and
    writing into a position of the corresponding segment at the input-video-stream frame rate of each input video stream respectively, which position has a corresponding offset, so as to implement image stitching.

5. The method for video-stream frame rate adaptation according to claim 1, wherein the dividing the buffer space into at least one segment further comprises: allocating a continuous segment ID for the divided segment of the buffer space, and determining an initial first segment ID and an initial second segment ID of the buffer space;
    in the Step S1, having the accumulated first segment ID and second segment ID being carried in the pulse signal generated periodically; and
    in the Steps S2 and S3, addressing the corresponding segment according to the first segment ID and the second segment ID carried in the pulse signal so as to perform the data writing operation and the data reading operation.

6. The method for video-stream frame rate adaptation according to claim 5, wherein after the reading operation is performed for a video frame of the second segment, the method further comprises a step of allocating a new segment ID, which is numbered continuously with the allocated segment ID of the buffer space, for the segment.

7. A device for video-stream frame rate adaptation, comprising an input/output interface unit and a buffering unit, and further comprising:
    a buffer space allocating unit, which is connected with the buffering unit, used for allocating a buffer space for each of at least one video conference room;
    a segment dividing unit, which is connected with the buffering unit, used for dividing the buffer space into at least one segment, each segment of which is used for buffering a video frame;
    a pulse generating unit, which is connected with the input/output interface unit, used for generating a segment pulse for each of the at least one video conference room periodically according to a certain pulse rate and sending the same to the input/output interface unit;
    a writing controlling unit, which is connected with the pulse generating unit, the input/output interface unit and the buffering unit, used for performing a data writing operation for a first segment of the corresponding buffer space at an input-video-stream frame rate of the video conference room when receiving the generated pulse signal, and performing the data writing operation for the segment next to the first segment at the input-video-stream frame rate when receiving the next pulse signal generated; and
    a reading controlling unit, which is connected with the pulse generating unit, the input/output interface unit and the buffering unit, used for performing a data reading operation for a second segment of the buffer space at an output-video-stream frame rate when receiving the generated pulse signal, and performing the data reading operation for the segment next to the second segment at the output-video-stream frame rate when receiving the next pulse signal generated.

8. The device for video-stream frame rate adaptation according to claim 7, further comprising: a pulse rate determining unit, which is connected with the pulse generating unit, used for determining the pulse rate of the video conference room according to a minimum of the input-video-stream frame rate and the output-video-stream frame rate of the video conference room, wherein the pulse rate is not higher than the minimum of the input-video-stream frame rate and the output-video-stream frame rate of the video conference room.

9. The device for video-stream frame rate adaptation according to claim 7, wherein the first segment and the second segment of the buffer space are the same segment of the buffer space.

10. The device for video-stream frame rate adaptation according to claim 7, further comprising: an image compressing unit, which is configured between the input/output interface unit and the writing controlling unit, used for performing data compression processing for each of at least one input video stream of the video conference room composed of multiple images and sending the processed video stream to the writing controlling unit, so that the writing controlling unit is adapted to write into a position of the corresponding segment at the input-video-stream frame rate of each input video stream respectively, which position has a corresponding offset, so as to implement image stitching, wherein each image of the video conference room composed of the multiple images is related to one of the at least one input video stream.

11. The device for video-stream frame rate adaptation according to claim 7, further comprising: a segment ID allocating unit, which is connected with the buffering unit and the pulse generating unit, used for allocating a continuous segment ID for the divided segment of the buffer space, and determining an initial first segment ID and an initial second segment ID of the buffer space and sending the same to the pulse generating unit, so that the pulse signal generated periodically by the pulse generating unit is adapted to carry the accumulated first segment ID and second segment ID, and the writing/reading controlling unit is adapted to address the corresponding segment according to the first segment ID and the second segment ID carried in the pulse signal so as to perform the data writing operation and the data reading operation.

12. The device for video-stream frame rate adaptation according to claim 11, further comprising: a segment ID updating unit, which is connected with the buffering unit, used for allocating a new segment ID, which is numbered continuously with the allocated segment ID of the buffer space, for the segment after the reading operation is performed for a video frame of the second segment.

13. A Field Programmable Gate Array chip, being configured with the device for video-stream frame rate adaptation according to claim 7.

14. A video stream processing apparatus, being configured with the device for video-stream frame rate adaptation according to claim 7.

15. The method for video-stream frame rate adaptation according to claim 1, wherein the first segment is a predetermined distance prior to the second segment.

16. The device for video-stream frame rate adaptation according to claim 7, wherein the first segment is a predetermined distance prior to the second segment.

17. A video stream processing apparatus, being configured with the Field Programmable Gate Array chip according to claim 13.

18. The method for video-stream frame rate adaptation according to claim 1, wherein each segment stores one video frame.

19. The device for video-stream frame rate adaptation according to claim 7, wherein each segment stores one video frame.

* * * * *